(No Model.)

T. SUTHERLAND.
VEHICLE RUNNING GEAR.

No. 472,280. Patented Apr. 5, 1892.

WITNESSES
F. L. Ourand
E. E. Lodge

Thomas Sutherland
INVENTOR
By W. T. Fitzgerald & Co.
Attorneys

UNITED STATES PATENT OFFICE.

THOMAS SUTHERLAND, OF STILLWATER, MINNESOTA.

VEHICLE RUNNING-GEAR.

SPECIFICATION forming part of Letters Patent No. 472,280, dated April 5, 1892.

Application filed August 13, 1891. Serial No. 402,541. (No model.)

*To all whom it may concern:*

Be it known that I, THOMAS SUTHERLAND, a citizen of the Dominion of Canada, residing at Stillwater, in the county of Washington and State of Minnesota, have invented certain new and useful Improvements in Vehicle Running-Gears; and I do hereby declare the following to be a full, clear, and exact description of the invention, such as will enable others skilled in the art to which it appertains to make and use the same.

My invention consists in a new and improved running-gear for all kinds of vehicles, which enables the same to turn in an unusually limited space and provides an automatic adjustment when the front wheels are passing over uneven ground.

The invention will be hereinafter fully described and claimed.

Figure 1:
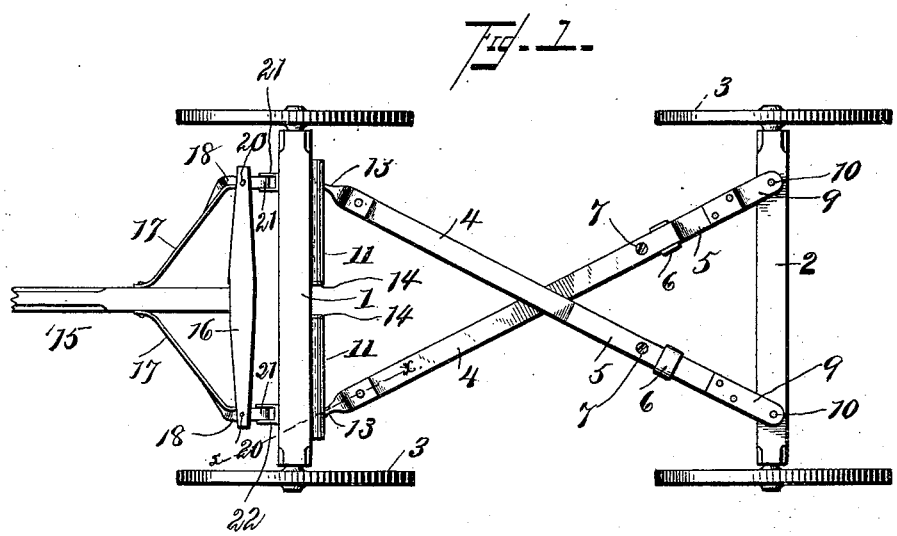
Figure 2:
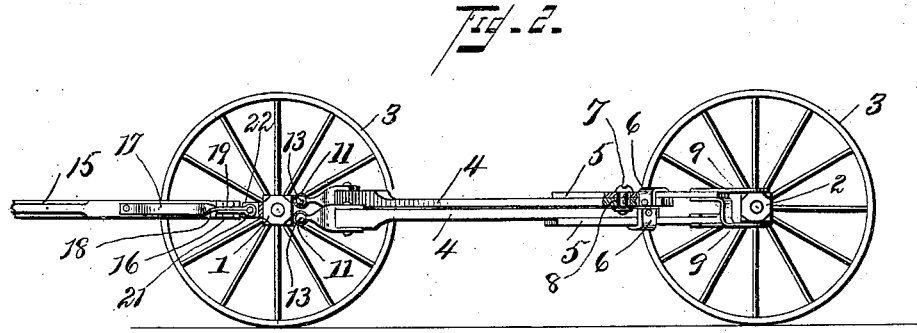
Figure 3:
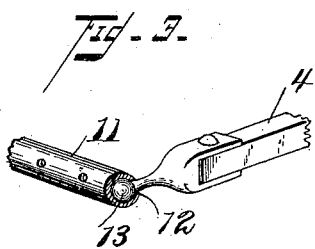
Figure 4:
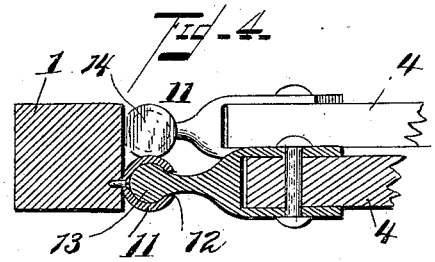

Referring to the accompanying drawings, Figure 1 is a top plan view of my new and improved vehicle running-gear. Fig. 2 is a side elevation of the same, the near wheels being removed. Fig. 3 illustrates in perspective a detail, on an enlarged scale, of the coupling at the forward end of one of the reaches. Fig. 4 shows a sectional view on line $x\ x$, Fig. 1.

Referring to the several parts by their designating numerals, 1 indicates the front axle and 2 the rear axle, on the ends of which the wheels 3 are mounted. The reaches are preferably made in two sections, a forward section 4 and a rear section 5, that the distance between the front and rear wheels may be easily increased or lessened. A clip or stirrup 6 is secured on the rear end of the front section 4, through which the forward end of the rear section 5 passes, and a bolt 7, passing down through apertures 8 into the overlapping ends of the two sections adjustably secures them in position. If preferred, however, the reaches may each be formed of one piece. To the rear end of each reach is secured a metal clip 9, the rear ends of which fit above and below the rear axle near the ends of the same and are there pivotally secured by pivot-bolts 10. To the rear side of the front axle 1 I secure the guides 11, each of which extends from near the middle of the axle to near the outer end thereof, as shown. The said guides may be formed in a single piece or of separate sections, being O- shaped in cross-section and provided on their rear sides with the longitudinal slot 12. The front ends of the reaches or couplings 4 are provided with the transverse or horizontal cylindrical heads 13, which are pivotally joined to said reaches and are adapted to fit into and follow the guides 11. The guides 11 are separated at their inner ends by the solid section 14, which prevents the heads 13 on the forward ends of the reaches 4 from coming in contact with each other. One of the guides is placed near the upper edge of the axle while the other is secured to the lower edge, thus placing the crossed ends of the couplings 4 out of contact with each other.

By means of the above-described construction it will be seen that when the vehicle thus equipped is drawn forward the crossed ends of the couplings 4 will slide in the bearings provided by the guide toward and against the section 14; but when the vehicle is turned the end of the coupling on that side toward which the wagon is being turned will slide to the outer end of its guide and thus throw the rear wheels in such position as will enable the vehicle to turn in a very limited circle. If the wagon is turned in the other direction, the end of the other coupling will slide to the outer end of its guide and produce the same result. The guides enable the end of the couplings 4 to drop toward the center of the axle when the wagon is being drawn forward, thus serving as an ordinary coupling-pole and also enable said coupling to have another function when the vehicle is being turned or drawn over uneven surfaces, as set forth.

15 indicates the tongue, to the rear end of which is secured the cross-bar 16. This cross-bar is braced by the brace-irons 17, bolted at their outer ends to the sides of the tongue and extending back to the ends of the cross-bar 16, where they are twisted or turned at right angles, so as to occupy a horizontal plane, and the ends 18 pass through horizontal slots 19 in the ends of the cross-bar 16, being doubled upon themselves, and pass back through the said slots, where they are held by vertical bolts 20, forming the horizontal eyes 21, which are pivoted in bearings 22, secured to the forward side of the front axle.

It will be seen that by this peculiar construction the inclined braces 17 constitute supports or braces for the tongue and coupling-eyes, whereby the tongue is pivotally connected to the forward axle.

Having thus described my invention, what I claim, and desire to secure by Letters Patent, is—

1. The combination, in a running-gear, of the supporting-guides 11, secured to the rear side of the front axle, one above the plane of the other, the reaches 4, arranged to cross each other and having in their rear ends the clips 9 and at their forward ends the bearing-heads 13, adapted to reciprocate within the guides, substantially as set forth.

2. The combination, with the front and rear axles, of the reaches, having the rear end clips 9 and formed with the cylindrical heads 13 on their forward ends, the guides 11, secured to the rear face of the front axle and adapted to receive the cylindrical heads 13, substantially as set forth.

In testimony whereof I affix my signature in presence of two witnesses.

THOMAS SUTHERLAND.

Witnesses:
BELLA C. RANKIN,
A. E. MACARTNEY.